April 9, 1968
B. G. E. STIFF
3,377,260
ELECTROCHEMICAL MACHINING USING A WHEEL
ELECTRODE HAVING A SLOTTED PERIPHERY
Filed March 18, 1965
2 Sheets-Sheet 1
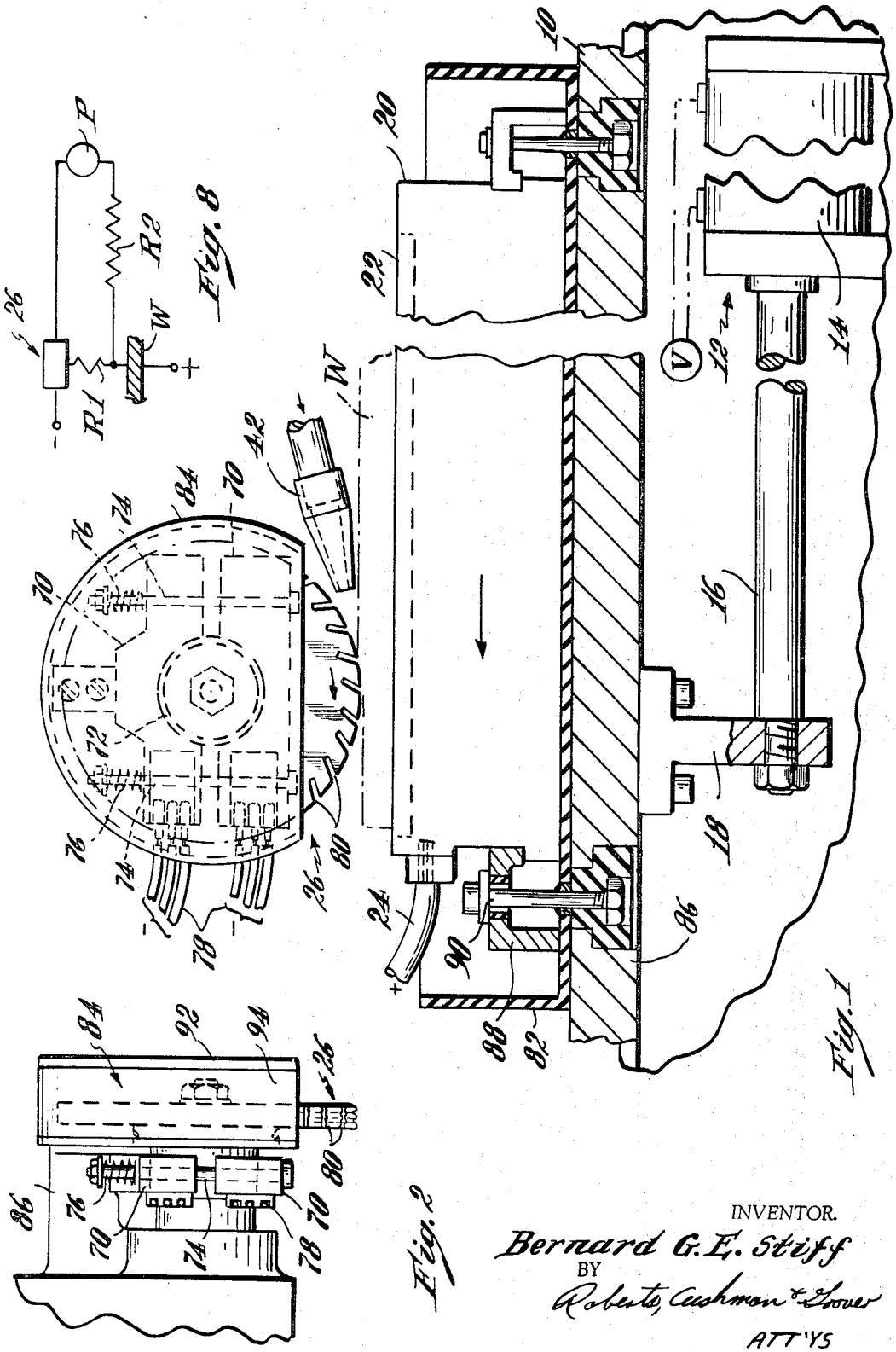
INVENTOR.
Bernard G. E. Stiff
BY
Roberts, Cushman & Grover
ATT'YS

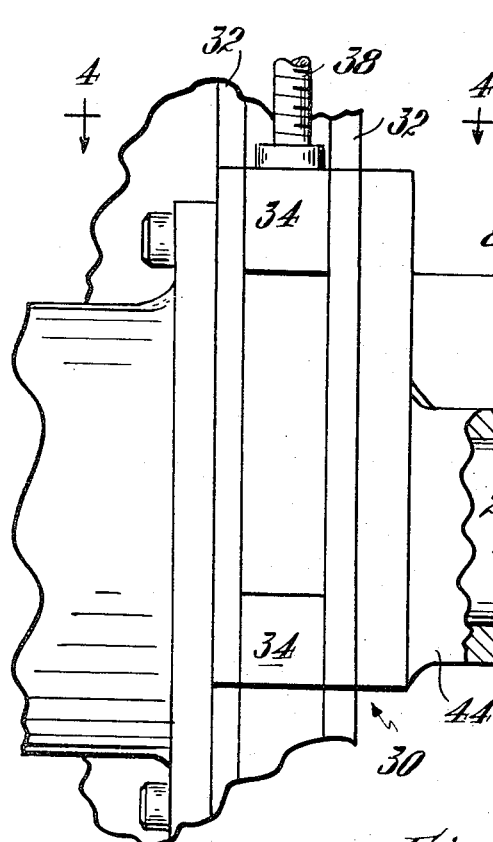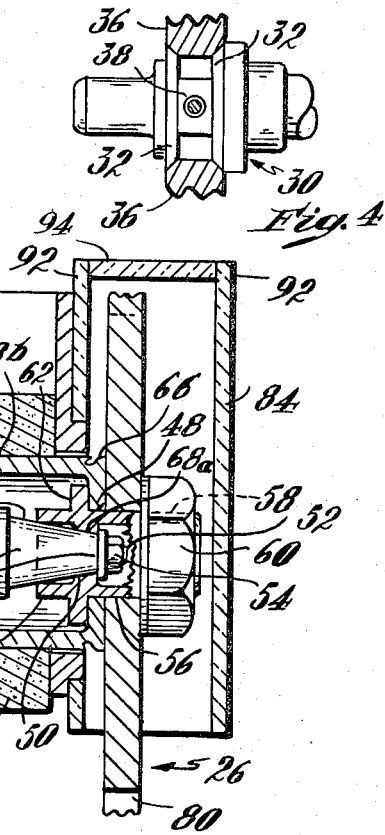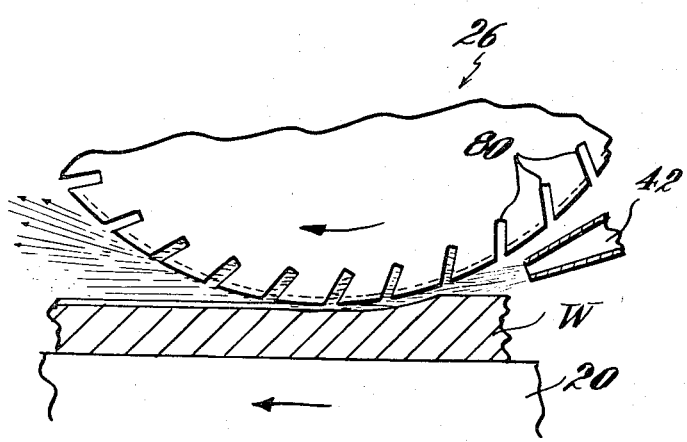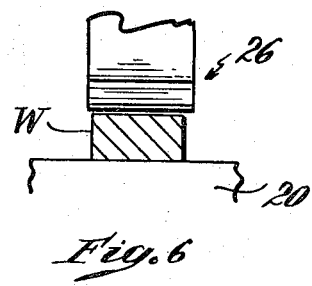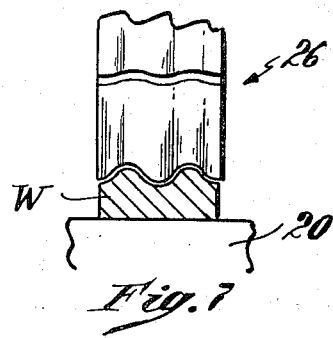

United States Patent Office 3,377,260
Patented Apr. 9, 1968

3,377,260
ELECTROCHEMICAL MACHINING USING A WHEEL ELECTRODE HAVING A SLOTTED PERIPHERY
Bernard G. E. Stiff, Lynnfield, Mass., assignor to The Lapointe Machine Tool Company, Hudson, Mass., a corporation of Maine
Filed Mar. 18, 1965, Ser. No. 440,835
12 Claims. (Cl. 204—143)

This invention relates to electrolytic shaping and, in particular, to electrolytic shaping of very hard alloy metals which are difficult to machine, though it is to be understood that it is equally applicable to shaping metals of lesser and/or varying degrees of hardness.

The principal objects of this invention are to provide a machine for shaping metal or other electrolytically dissoluble materials to dimensions at least as good as are presently obtained by precision machining operation without mechanical contact of a shaping tool with the work metal and hence without having to periodically redress the tool and without tool replacement costs; to provide a machine in which the tool need not contain an abrasive either to assist in shaping the work or to remove the oxide or salt evolved during shaping to enable continuation of the process thereby avoiding the high cost of abrasive tools and accidentally scratching or scoring of the work by the use of abrasive tools; to provide a machine in which the tool need not contain insulating means to prevent arcing; to provide a machine wherein no special power source is required; to provide a machine in which the power may be supplied for limited periods without recharging by conventional storage batteries; to provide a machine in which the tool may be comprised of any soft, inexpensive metal or other conductive material which may be easily machined to the desired shape and is capable of holding its shape and resists dissolution; to provide a machine in which the metal removal during shaping can be effected at a higher rate than normal or conventional grinding operations; to provide a machine in which the removal of metal for shaping may be effected in a single operation rather than a series of steps, that is, directly from a rough piece of metal or from any intermediate stage to a final finished piece; and to provide a machine which is inexpensive to build and operate. A further object is to provide a method of electrolytic shaping which enables repeatable shaping performance within an accuracy of .001″ and better.

As herein illustrated, the machine comprises a support to which the workpiece to be shaped is adapted to be secured during shaping, a part supported at a predetermined distance from the support which has a surface complemental to the shape to be imparted to the workpiece, means for effecting relative movement of the part and work progressively to advance successive fresh portions of the part and workpiece linearly relative to each other, such that the zone of effective operation shifts continuously lengthwise of the work, and means for delivering an excess of electrolyte to the zone of operation as it shifts; characterized in that there is means associated with the part operable to transport predetermined finite quantities of electrolyte at a predetermined rate between the part and the work as the operation progresses increment-by-increment.

The part, as herein used in the practice of this invention, is a wheel mounted for rotation about an axis parallel to the work support, the peripheral surface of which is complemental to the shape to be imparted to the workpiece. The means for effecting transport of the electrolyte comprises slots in the peripheral surface of the wheel operative, as the wheel rotates, to entrain finite bodies of electrolyte and to transport them in rapid succession between the surface of the wheel and the workpiece at such a rate as to maintain a substantially continuous phase of electrolyte between the wheel and the workpiece. Rotation of the wheel also imparts a substantial centrifugal force to the individual bodies of electrolyte contained in the slots so as to force these confined bodies of electrolyte, as they travel between the wheel and work, into intimate and substantially continuous contact with the surface whether of plain or contoured shape. The wheel itself is comprised of a soft metal, is held at a distance below the exposed surface of the work corresponding to the depth of the cut to be made and preferably in the final shape to be imparted to the work so as to complete the shaping in one operation and at a distance from the surface of the work in the direction of feed substantially equal to the rate of removal of the metal from the work so that the surface of the metal never touches the work. The slots may be radial but preferably are inclined to the radius in the direction of rotation of the wheel. Graphite may be used instead of metal and the power for making the work anodic and the wheel cathodic is a direct current and may be obtained from any conventional source of direct current. The current for effecting electrolysis is supplied from the source directly to the face of the wheel without passing through the supporting shaft by means of a commutator fast to one face of the wheel and by means of brushes mounted on the commutator.

The method of shaping, as herein illustrated, comprises moving a part having a surface complemental to the surface of the workpiece to be formed to a position below the exposed surface of the work to be shaped and preferably to a position corresponding substantially to the full depth of the cut to be made, leaving a gap such that the part does not touch the workpiece, supporting the part and workpiece for movement relative to each other to continuously present successive fresh portions of the work and part to each other lengthwise of the work, supplying an excess of electrolyte to the gap between the part and the workpiece, establishing a circuit including the part, electrolyte and workpiece wherein the part is the cathode and the workpiece the anode, effecting relative movement such as to maintain a predetermined distance between the part and the constantly evolving surface of the workpiece as it takes shape increment-by-increment in the direction of feed, and while maintaining the spacing entraining finite bodies of electrolyte and transporting them successively between the part and workpiece at such a rate as to maintain a substantially continuous phase of electrolyte between the part and the workpiece at the successive places of dissolution.

The invention will now be described in greater detail with reference to the accompanying drawings wherein:

FIG. 1 is a fragmentary elevation of a machine designed for electrolytic shaping, showing a work support, a shaping tool in the form of a wheel supported above the work support, and a nozzle for supplying electrolyte, with a workpiece shown in dot and dash lines situated between the work support and the wheel;

FIG. 2 is a fragmentary elevation of the wheel support, electrical connection for supplying current to the wheel and the wheel housing;

FIG. 3 is a fragmentary elevation of the wheel support, to larger scale, showing the wheel mounting, electrical connection for supplying current to the wheel and the wheel housing, all in section;

FIG. 4 is a horizontal section taken on the line 4—4 of FIG. 3;

FIG. 5 is a view of the lower part of the wheel in elevation, part way along in the course of shaping a workpiece, showing the latter in section;

FIG. 6 is a fragmentary elevation taken transversely of the wheel showing a wheel having a flat peripheral surface for forming a flat surface on the workpiece;

FIG. 7 is a fragmentary elevation taken transversely of the wheel showing a wheel having a contoured peripheral surface for forming a correspondingly shaped surface on the workpiece; and FIG. 8 schematically illustrates the electrical circuit.

Referring to the drawings, there is shown a machine in which there is a table 10 supported for movement in a horizontal plane, and means in the form of a motor 12 for effecting movement of the table. A fluid-operable motor comprising a fixed cylinder 14 and a piston rod 16 connected to the underside of the table by a bracket 18, provides convenient means for effecting movement of the table and any one of an infinite number of feed rates may be obtained by using a valve V for controlling the supply of pressure fluid to the cylinder. Any other equivalent means such as a screw or gear train may be employed for effecting horizontal movement of the table.

The table has on it a block 20 for supporting a workpiece w for movement with the table. Conveniently the workpiece is held fast to the surface of the block by electromagnetic bars 22 recessed into the surface of the block. The electromagnetic bars are supplied with power through cables, a part of one such cable being shown at 24. Clamping dogs could, of course, be used instead of electromagnets.

A tool 26 in the form of a wheel is supported above the table 10 and supporting block 20 for rotation about a horizontal axis by a shaft 28 mounted transversely of the table for movement perpendicular to the top of the table to enable adjusting its perpendicular distance from the table. The shaft 28 is mounted on a carriage 30 comprises of a pair of plates 32—32 joined in spaced parallel relation by bolts to end blocks 34—34. The facing sides of the plates are beveled and slidably engage the opposed beveled edges of spaced parallel, vertically disposed tracks 36—36 (FIG. 4) for movement of the carriage vertically with respect to the top of the table. A screw 38 connected to the upper block provides for elevating and depressing the carriage and may have, although not shown, at its upper end a hand wheel by means of which it may be rotated. The workpiece w is made the anode and the wheel the cathode in an electrical circuit which is provided by supplying an electrolyte through a nozzle 42 to the downgoing side of the wheel close to the work to flood the wheel and work and by connecting the wheel and workpiece through the frame of the machine to the negative and positive side of a direct-current source power, as will be described in some greater detail hereinafter.

The need for insulating the wheel shaft 28 is conveniently avoided herein without loss of current and/or danger to personnel by employing brushes for supplying the current directly to one of the side faces of the wheeel so that the current does not pass through the shaft. As illustrated, the carriage 30 has projecting from it a hollow cylindrical bearing sleeve 44 in which is journaled the shaft 28. The end of the shaft 28 has a taper 46 adapted non-rotatably to receive a cylindrical hub 48 containing an internal tapered opening 50 for engagement with the tapered end of the shaft, and a threaded part 52 upon which a nut 54 is screwed for holding the hub clamped to the shaft. The hub has a cylindrical outer side 56 adapted to receive a hole in the wheel, a threaded part 58 adapted to receive a nut 60 for holding the wheel on the hub, and a clamping flange 62 against which the wheel is adapted to be clamped by the nut 60. In accordance with the invention, to transmit the current directly to the wheel a commutator ring 64 is mounted on the hub between the wheel and the flange comprising an annular part 66 containing a central hole 68a for receiving the hub and a cylindrical part 68b extending rearwardly therefrom concentric to the shaft. The outer surface of the commutator part 68b is smooth and a pair of brushes 70—70 are mounted on the commutator part 68b for carrying current from a suitable source through the commutator directly to the side surface of the wheel without passing through the shaft. The brushes 70—70 are carbon blocks (FIGS. 1 and 2) containing semicylindrical grooves 72—72 complementary to the part 68b and are yieldably held rotatably engaged therewith by bolts 74 and springs 76 mounted on the blocks at opposite sides of the commutator. Multiple conductor cables 78 connected to the ends of the blocks are provided for supplying current to the commutator and wheel.

The peripheral edge of the wheel, as shown in FIGS. 6 and 7, depending upon the shape to be imparted to the work has a smooth right-cylindrical surface, as shown in FIG. 6, for producing a flat surface, or a contoured surface, as shown in FIG. 7 to impart a corresponding shape to the work.

In the apparatus shown in FIG. 1, the wheel 26 is fixed and the work support 20 is movable relative thereto. However, it is within the scope of this invention and common in the art to mount the work support in a fixed position and to move the wheel linearly as well as rotationally relative to the work resting on the work support.

Heretofore it has been thought necessary to achieve precision comparable to that of normal grinding operation to employ a wheel embodying at its peripheral surface, at least, abrasive particles, such as diamond bort, to remove the oxide or salt formed during electrolysis; to provide insulating spacers at the surface to maintain a predetermined space between the wheel and work and to minimize arcing; and to pump the electrolyte between the wheel and work at certain predetermined rates and pressures. In accordance with this invention, far greater precision can be obtained than hertofore possible by employing a wheel which has a perfectly smooth peripheral surface except for the surface contour which is to be imparted to the work, that is, a surface bare of projecting abrasive or insulating particles, and which contains means operable, in conjunction with its rotation, to entrain and transport finite quantities of electrolyte between the surface of the wheel and the work at the place of closest proximity of the surface of the wheel with the work in such fashion as to support and maintain a substantially uniformly thin layer of electrolyte in intimate contact with the surface of the work. This is achieved herein by providing the wheel with a plurality of uniformly spaced slots in its peripheral surface. The slots 80 extend transversely of the wheel from one side surface to the other and are inclined at an angle of approximately 30° to the radius in the direction of rotation of the wheel. As herein illustrated, a 7½ inch diameter wheel is employed rotating at 3450 r.p.m., 36 slots are provided and each slot is ⅟₁₆″ wide and ½″ deep. The best results are obtained with slots disposed, as stated above, 30° to the radius. However, radially situated slots may be employed or slots inclined in the opposite direction. In any event, slots, whether located in one position or the other, produce better results than no slots at all.

The size of the wheel, the rate of rotation and the number, disposition and size of the slots will, of course, be dependent somewhat upon the character of the work and will be varied in whatever combination is necessary to achieve optimum results.

The slots 80 function to entrain finite bodies of electrolyte supplied by the nozzle 42 to the working area in excess of that which is needed and to transfer these confined, substantially solid bodies of electrolyte between the surface of the wheel and the work so as to maintain the space between the surfaces of the wheel and work uniformly filled with electrolyte at a pressure, created by the centrifugal action of the wheel, which forces the electrolyte against the surface of the work, causing it to conform intimately to the surface of the work whether the surface is flat or contains peaks and depressions, thus eliminating the adverse effect of air and/or gases evolved or entrained in the electrolyte which tend to insulate and hold the electrolyte away from the surface thus interfering with uniform flow of current. The wheel, in fact, acts like a centrifugal pump and drives the electrolyte in a solid confined stream through the gap between the opposed faces of the wheel and work with a minimum amount of turbulence thus confining the electrolyte to the working zone.

The slots herein illustrated extend through the wheel from one side surface to the other however recesses or pockets in the peripheral surface of the wheel may be employed to transfer the electrolyte into intimate contact with the work and such pockets may be supplied with electrolyte from a stream directed more-or-less tangentially toward the downgoing side of the wheel as illustrated in FIG. 5, or through radial passages extending from the pockets to the hub of the wheel which are connected through a suitable manifold to a source of electrolyte. Delivery of the electrolyte to the peripheral pockets in this way augments the centrifugal pressure of the electrolyte against the work.

In order to maintain a constant supply of electrolyte and to minimize loss by rotation of the wheel, there is provided a tray 82 and a wheel housing 84. The tray is electrically nonconductive, is substantially rectangular and is mounted on a table 10 with its bottom between the bottom of the block 20 and the top of the table. The block has shoulders 86—86 at its opposite ends and clamps 88—88 are mounted in the tray astride the shoulders and the bottom. Bolts 90 electrically insulated from the table bind the clamps against the shoulders. The tray is provided with a discharge opening (not shown) through which the electrolyte may be withdrawn by a suitable pump P and resupplied to the nozzle 42. The wheel housing 84 is mounted on a bracket arm 86 extending from the carriage 30 and has spaced parallel circular walls 92—92 at opposite sides of the wheel and a peripheral wall 94 extending around the major portion of the wheel so that only the lower part of the wheel is exposed. As illustrated, the lower sides and ends of the walls 92—92 and 94 are cut off substantially parallel to the table. The wheel housing is preferably transparent plastic to enable constant observation of the operation and is electrically non-conductive.

The circuit shown schematically in FIG. 8 for effecting electrolysis is supplied with direct current from a suitable source of direct current. A conventional 6-volt direct current storage battery may be employed where the amount of work does not require too frequent recharging. The negative side of the source is connected to the wheel so that current flows from the wheel through the electrolyte, represented by the resistance R1, to the work and back to the positive side of the source. The resistance of the electrolyte circulating in the system, represented by the higher resistance R2, prevents any substantial loss of current from the circuit and any substantial danger to personnel.

A feed rate which may be achieved manually or automatically of the order of ¼ to 1" per minute provides for an accuracy in the order of .001". Within the aforesaid feed rate higher accuracy is achieved at the higher feed rate. The rate of feed is maintained constant and the expression "increment-by-increment" used herein in describing the shaping action and in the claims means that the metal is removed continuously but in vary small amounts and is not intended to mean or to be construed to mean that the metal is removed in a series of successive steps or that the feeding movement of the wheel is in a series of intermittent steps.

The wheel is supported and moved relative to the work so that its surface does not have contact with the evolving surface of the work as the latter is shaped and hence is not subjected to abrasive action and will last indefinitely without repressing, since the products of the electrolysis are a solution of the electrolyte and the metal removed in the process at the surface of the part and free hydrogen at the surface of the wheel. By adjusting the rate of feed and the rate of dissolution a gap may be maintained between the wheel and work which is just enough to prevent the wheel touching the work and yet to obtain a slight rubbing action on the oxide or salt formed by the electrolysis. As a matter of fact, the oxide or salt is in most instances so fragile and tender that the lightest touch of the wheel will break it up and this, augmented by the rapid movement of the electrolyte carried around by the slots in the wheel brush the oxide or salt from the surface of the work so that electrolysis continues uninterruptedly. Since the oxide or salt itself is not electrically conductive, contact of the wheel therewith does not result in arcing.

The electrolyte may be used for a considerable length of time before it becomes so loaded with metal as to make it necessary to renew it. An inexpensive and easy metal for making the wheel from the standpoint of making complex contours is brass or copper. Graphite may be employed in place of metal with equally good results in cutting material that remains conducting. The only disadvantage of the graphite wheel is that it may be accidentally chipped or broken by careless operation or handling.

In the preferred practice of the invention the wheel is set at a perpendicular distance from the work support corresponding substantially to the final dimension which is to be imparted to the work, so that the entire shaping operation is made in one step rather than a series of steps, such as is employed in conventional grinding operations. Furthermore, shaping may be accomplished starting with the rough unsanded metal without any intermediate operation as long as it is conducting, although it is to be understood, of course, that the operation may be performed on partly machined work.

In practice, the workpiece to be shaped is placed on the work support, the wheel is set in rotation, the carriage is lowered to bring the lower edge of the wheel down below the surface of the workpiece by an amount substantially equal to the final cut to be made, electrolyte is supplied to the nozzle and then the work support is traversed relative to the wheel to advance the workpiece continuously lengthwise of its surface. The feed is provided at a rate corresponding substantially to the electrolytic dissolution of the metal and to maintain a constant gap between the wheel and workpiece large enough to prevent arcing but small enough so that it will have some rubbing contact with the evolved oxide or salt (if present). As illustrated, the work is moved in a direction as indicated by the arrow (FIGS. 1 and 5) which is the same direction as the direction of rotation of the wheel. This has the advantage that the electrolyte is delivered directly to the surface which is being shaped where the most vigorous electrolytic action is desired and is carried away from the finished surface as indicated by the arrow at the left side of the wheel where no further electrolytic action is desired which might spoil the precision obtained.

It should be understood that the present disclosure is for the purpose of illustration only and that this invention includes all modifications and equivalents which fall within the scope of the appended claims.

I claim:

1. In an apparatus for electrolytic shaping a metallic workpiece, the apparatus including means for holding the workpiece, an electrically conductive wheel electrode, means rotatably supporting said wheel electrode, including means for rotating said electrode relative to said workpiece, means for causing converging relative movement between said wheel electrode and the workpiece and for maintaining a gap therebetween, thereby defining a working space, means externally of said wheel for supplying electrolyte to said working space at the downgoing side of said wheel electrode adjacent said gap, and a source of electric current connected across said workpiece and said wheel electrode to make said workpiece predominantly anodic; the improvement wherein said wheel contains substantially uniform inclined slots, spaced about the periphery of said wheel to entrain and supply a substantially continuous flow of finite bodies of electrolyte through said working space.

2. Apparatus according to claim 1 wherein the slots are inclined forwardly relative to the periphery in the direction of rotation of the wheel.

3. Apparatus according to claim 2, wherein the slots are inclined at an angle of about 30° to the radii.

4. Apparatus according to claim 1, wherein the wheel is comprised of brass.

5. Apparatus according to claim 1, wherein the wheel is comprised of graphite.

6. Apparatus of claim 1, wherein the peripheral surface of the wheel between slots is uniformly smooth.

7. Apparatus of claim 1, wherein the width of said slots circumferentially of the wheel is greater than the gap.

8. Apparatus of claim 7 wherein the depth of said slots is greater than the width of said slots.

9. The method of electrolytically shaping a metallic workpiece comprising supporting said workpiece and an electrically conductive wheel having means in the periphery thereof for entraining electrolyte for rotation of the wheel relative to said workpiece and for relative converging movement of the wheel and workpiece, effecting rotation of the wheel and convergent relative movement of the wheel and workpiece to establish and maintain a gap between them thereby defining a working space, supplying electrolyte to the peripheral surface of the wheel at the down going side adjacent the gap whereby finite quantities of electrolyte are entrained at the peripheral surface of the wheel and transported in succession through said working space at a rate such as to constitute a substantially continuous flow of electrolyte through said gap and connecting the wheel and workpiece in an electrical circuit including the electrolyte such that the workpiece is predominantly anodic.

10. The method of claim 9 comprising centrifugally forcing such finite quantities of electrolyte by means of rotation with the wheel against the workpiece as its travels through the gap.

11. The method of claim 9 comprising carrying the electrolyte away from the workpiece at the outgoing side of the wheel.

12. The method of claim 9 wherein the peripheral surface of the wheel is complemental to that surface which is to be imparted to the workpiece.

References Cited

UNITED STATES PATENTS

| | | | |
|---|---|---|---|
| 2,764,543 | 9/1956 | Comstock et al. | 204—143 |
| 3,338,808 | 8/1967 | Johnson | 204—143 |

ROBERT K. MIHALEK, *Primary Examiner.*